(12) United States Patent
Barlow

(10) Patent No.: US 9,828,273 B2
(45) Date of Patent: Nov. 28, 2017

(54) MULTI-STAGE PORTABLE WATER PURIFIER

(71) Applicant: Michael M. Barlow, Naples, FL (US)

(72) Inventor: Michael M. Barlow, Naples, FL (US)

(*) Notice: Subject to any disclaimer, the term of this patent is extended or adjusted under 35 U.S.C. 154(b) by 0 days.

(21) Appl. No.: 15/050,791

(22) Filed: Feb. 23, 2016

(65) Prior Publication Data
US 2017/0240449 A1    Aug. 24, 2017

(51) Int. Cl.
| | | |
|---|---|---|
| *C02F 9/00* | (2006.01) |
| *C02F 1/76* | (2006.01) |
| *C02F 1/28* | (2006.01) |
| *C02F 1/44* | (2006.01) |
| *B01D 61/14* | (2006.01) |
| *C02F 103/00* | (2006.01) |

(52) U.S. Cl.
CPC ............ *C02F 9/005* (2013.01); *B01D 61/145* (2013.01); *C02F 1/283* (2013.01); *C02F 1/444* (2013.01); *C02F 1/76* (2013.01); *C02F 2103/001* (2013.01); *C02F 2103/007* (2013.01); *C02F 2201/006* (2013.01); *C02F 2303/02* (2013.01); *C02F 2303/04* (2013.01)

(58) Field of Classification Search
CPC ........ B01D 61/145; C02F 1/002; C02F 1/283; C02F 1/444; C02F 1/76; C02F 9/005; C02F 2201/006; C02F 2303/02; C02F 2303/04; C02F 2303/185
See application file for complete search history.

(56) References Cited

U.S. PATENT DOCUMENTS

| | | |
|---|---|---|
| D256,719 S | 9/1980 | Rose |
| 4,298,475 A | 11/1981 | Gartner |
| D288,115 S | 2/1987 | McCausland et al. |
| D310,707 S | 9/1990 | Sedman |
| 5,273,649 A | 12/1993 | Magnusson et al. |
| 5,456,831 A | 10/1995 | Sullivan |
| 5,580,447 A | 12/1996 | Platter et al. |
| D400,755 S | 11/1998 | Ferlin, Jr. |
| 6,120,686 A * | 9/2000 | Bilz ...................... B01J 47/002 210/248 |
| 7,316,323 B2 | 1/2008 | Collias et al. |
| 7,896,168 B2 | 3/2011 | Collias et al. |
| 8,119,012 B2 | 2/2012 | Bahm et al. |
| 8,318,011 B2 | 11/2012 | O'Brien et al. |
| 8,425,771 B2 | 4/2013 | O'Brien et al. |
| D718,414 S | 11/2014 | Lo |
| D723,135 S | 2/2015 | Haslem |
| D740,916 S | 10/2015 | Doi et al. |
| D741,982 S | 10/2015 | Maeng |

(Continued)

*Primary Examiner* — Matthew O Savage
(74) *Attorney, Agent, or Firm* — Livingston Loeffler, P.A.; Edward M. Livingston, Esq.; Bryan L. Loeffler, Esq.

(57) ABSTRACT

A portable water purifying apparatus, including a shell and a hollow, elongated chamber. The apparatus includes a first opening that feeds into this chamber, through which the user draws contaminated water into the chamber, and a second opening for removing purified water from the chamber. Purification of the contaminated water drawn into the apparatus is effected by water purification media, which may include an ultrafiltration membrane; a halogenated resin; and granulated, activated carbon. The apparatus may also include one or more cleanable, removable, replaceable cartridges for containing the water purification media.

2 Claims, 12 Drawing Sheets

(56) References Cited

U.S. PATENT DOCUMENTS

2004/0112826 A1\* 6/2004 Chiba .................. A47G 21/188
 210/454
2008/0105618 A1\* 5/2008 Beckius ............... B01D 63/024
 210/650

\* cited by examiner

MULTI-STAGE PORTABLE WATER PURIFIER

FEDERALLY SPONSORED RESEARCH OR DEVELOPMENT

Not Applicable.

TECHNICAL FIELD

This invention relates to a compact, portable water purification device that may be hand-held, or used with gravity-feed source water container, or attached to a hand pump. The device purifies contaminated water from lakes, streams, ponds, other surface water sources, wells, or rainwater. The device will remove particulates, and kill pathogens, bacteria, and viruses, on-contact and on-demand from contaminated water, with no extended residence time.

BACKGROUND OF THE INVENTION

Uncontaminated potable water is essential to all animal and plant life. Normally, ample supplies of potable water are readily available for residential, commercial, and agricultural purposes.

However, persons who are living or working outside of established urban or rural communities, such as hikers, outdoorsmen, travelers, and soldiers, may experience shortages of potable water. In such cases, there is a need for a portable, lightweight device that can be used to purify water that contains microbiological contaminants.

Various types of portable water devices are known. Some of the know devices include those shown and described in U.S. Pat. Nos. 8,318,011 and 4,298,475. While these devices are said to be generally suitable for their purposes, there appears to be a market demand for a new device that meets different needs.

SUMMARY OF THE INVENTION

The invention is a portable water purifying apparatus. The apparatus includes a shell and a hollow elongated chamber, and is generally shaped like, and may be used in the manner of, a drinking straw. The apparatus includes a first opening that feeds into this chamber, typically at the bottom of the apparatus. It is through this first opening that contaminated water is drawn into the chamber.

The elongated chamber also a second opening, typically at the top of the apparatus, for removing purified water from the chamber.

Purification of the contaminated water drawn into the apparatus is effected by water purification media. In the broadest structure of the invention, any number of media may be used. While one or two such media may be used, the preferred embodiment of the invention includes three purification media.

Specifically, the preferred media include an ultrafiltration membrane; a halogenated resin; and granulated, activated carbon.

The chamber of the water purifying apparatus may be divided into, and be comprised of, two parts. These two parts include a first lower chamber, and a second upper chamber. The structures defining the first lower chamber and the second upper chamber may be releasably secured to each other, as with complementary male and female threads. Preferably, the ultrafiltration membrane is substantially contained within the first lower chamber, and the halogenated resin and granulated, activated carbon are substantially contained within the second upper chamber.

In yet another aspect of the invention, the first lower chamber includes a first removable cartridge, and the second upper chamber includes a second removable cartridge. The first removable cartridge may contain the ultrafiltration membrane, and the second removable cartridge may contain both the halogenated resin and the granulated, activated carbon.

BRIEF DESCRIPTION OF THE DRAWINGS

Preferred embodiments of the invention are shown in the accompanying drawings.

DETAILED DESCRIPTION

Figure 1:
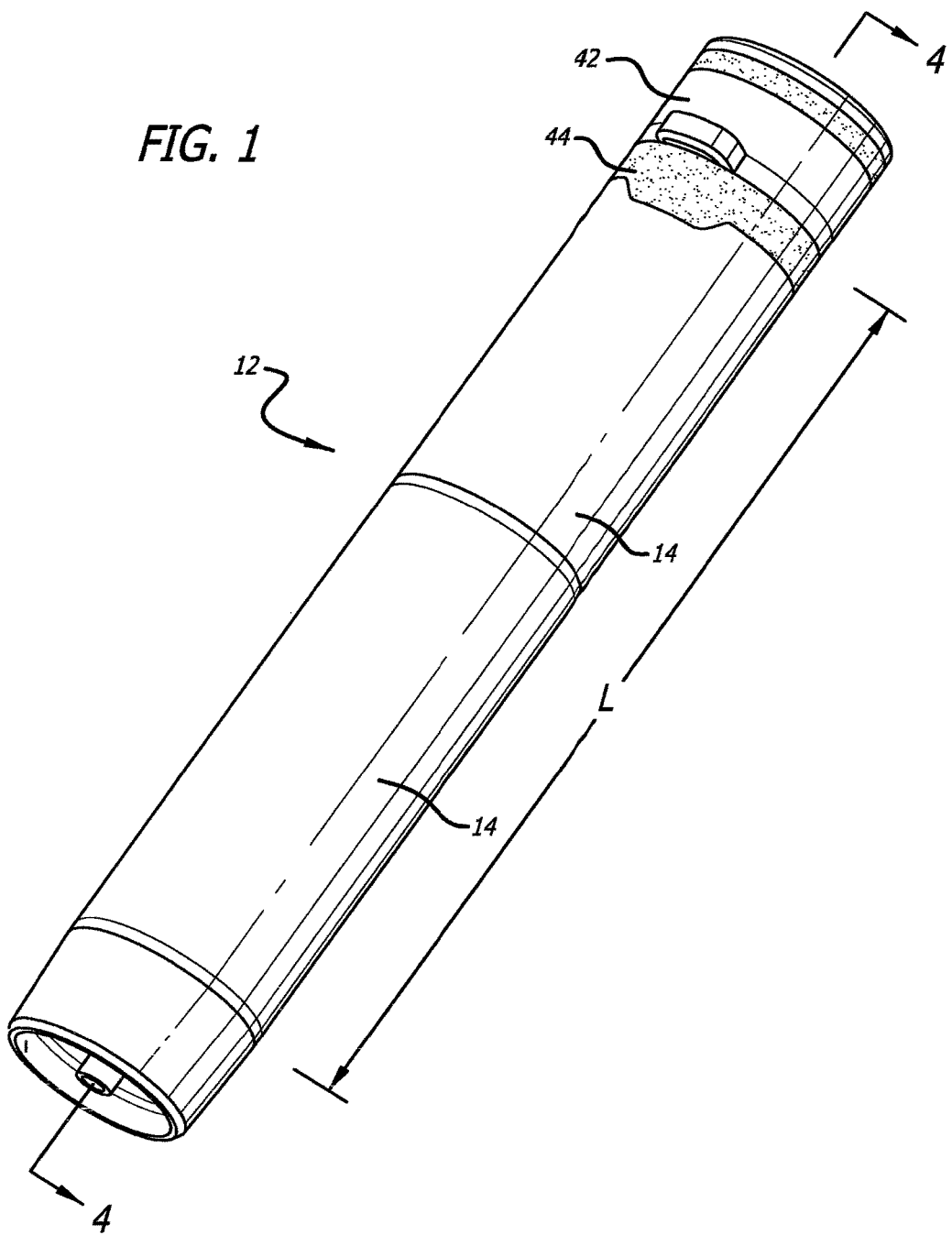
FIG. 1 is a perspective view of the preferred embodiment of the invention, with its top protective cap in place.

As may best be seen in FIG. 1, the invention is a portable water purifying apparatus 12. In a general sense, the apparatus 12 is shaped and may be used in the manner of a drinking straw. It this embodiment, the apparatus 12 has an overall length of approximately nine (9) inches, and a diameter of approximately one and one-half (1½) inches.

Figure 4:
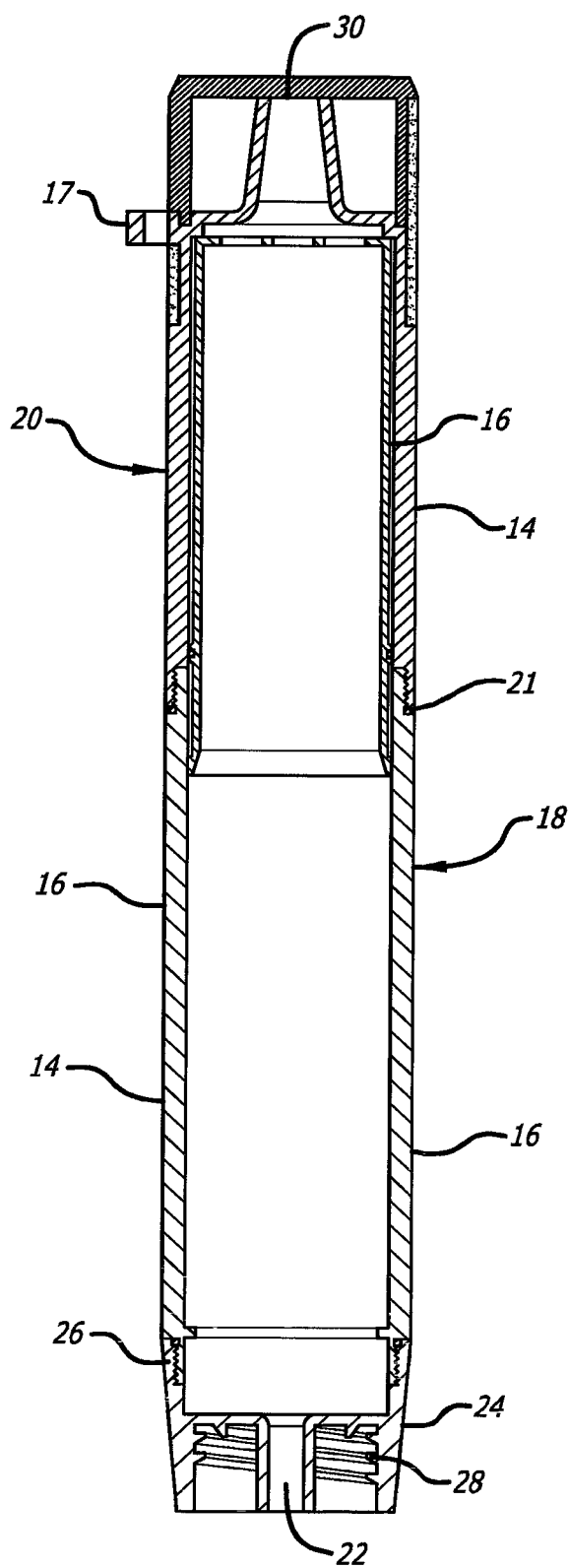
FIG. 4 is a cross-sectional view taken along lines 4-4 of FIG. 1, showing various internal components of the apparatus of FIG. 1.

As may be seen in FIGS. 1 and 4, the apparatus 12 has an outer shell 14, and a generally hollow interior within that outer shell 14. The outer shell 14 is made from a hard, durable food grade polymer or plastic. A preferred plastic is acrylonitrile butadiene styrene (ABS). As may be seen in FIG. 4, this outer shell 14 defines a hollow, elongated inner chamber 16.

Figure 2:
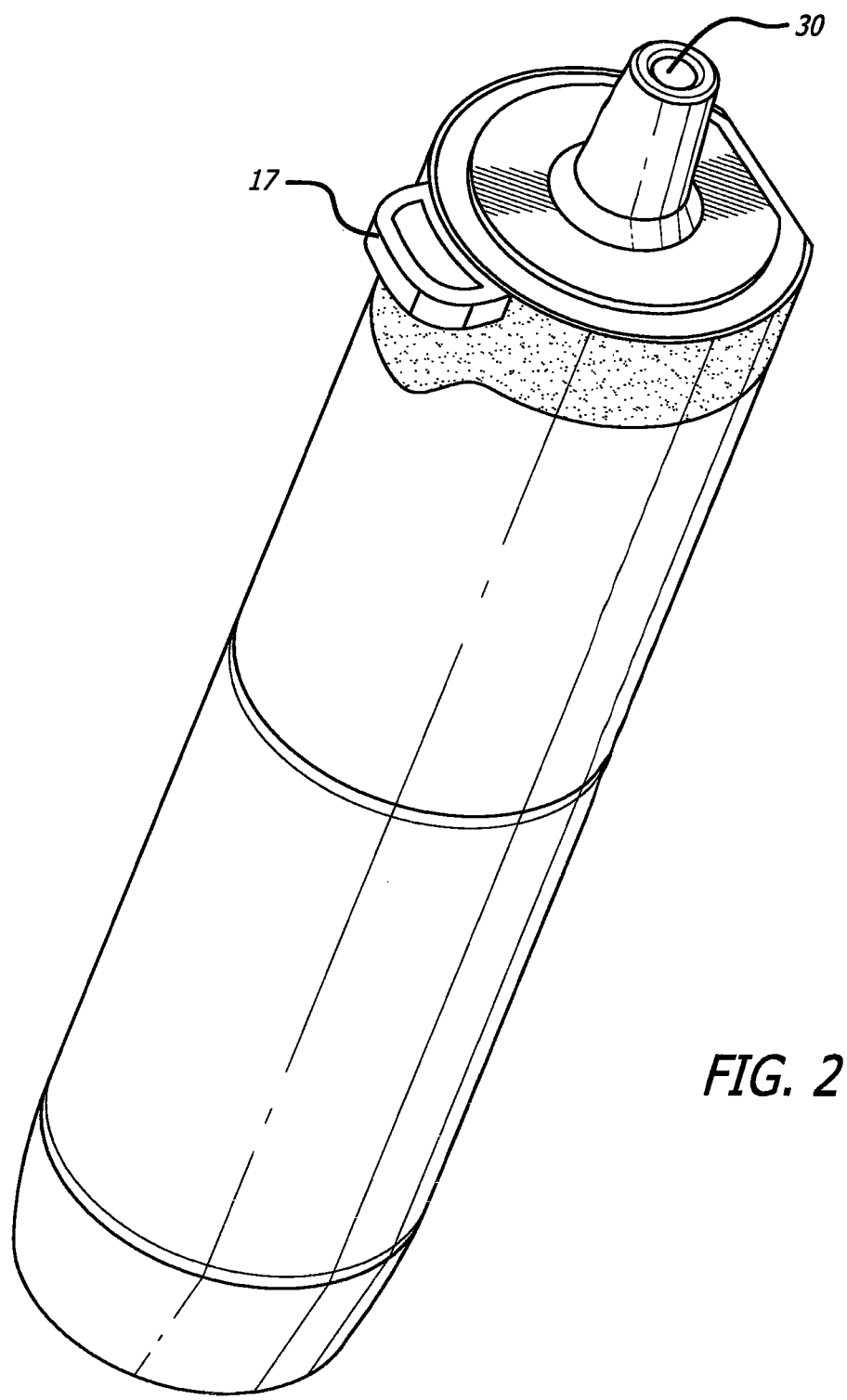
FIG. 2 is another perspective view of the embodiment of FIG. 1, but with its top, protective cap removed.
Figure 3:
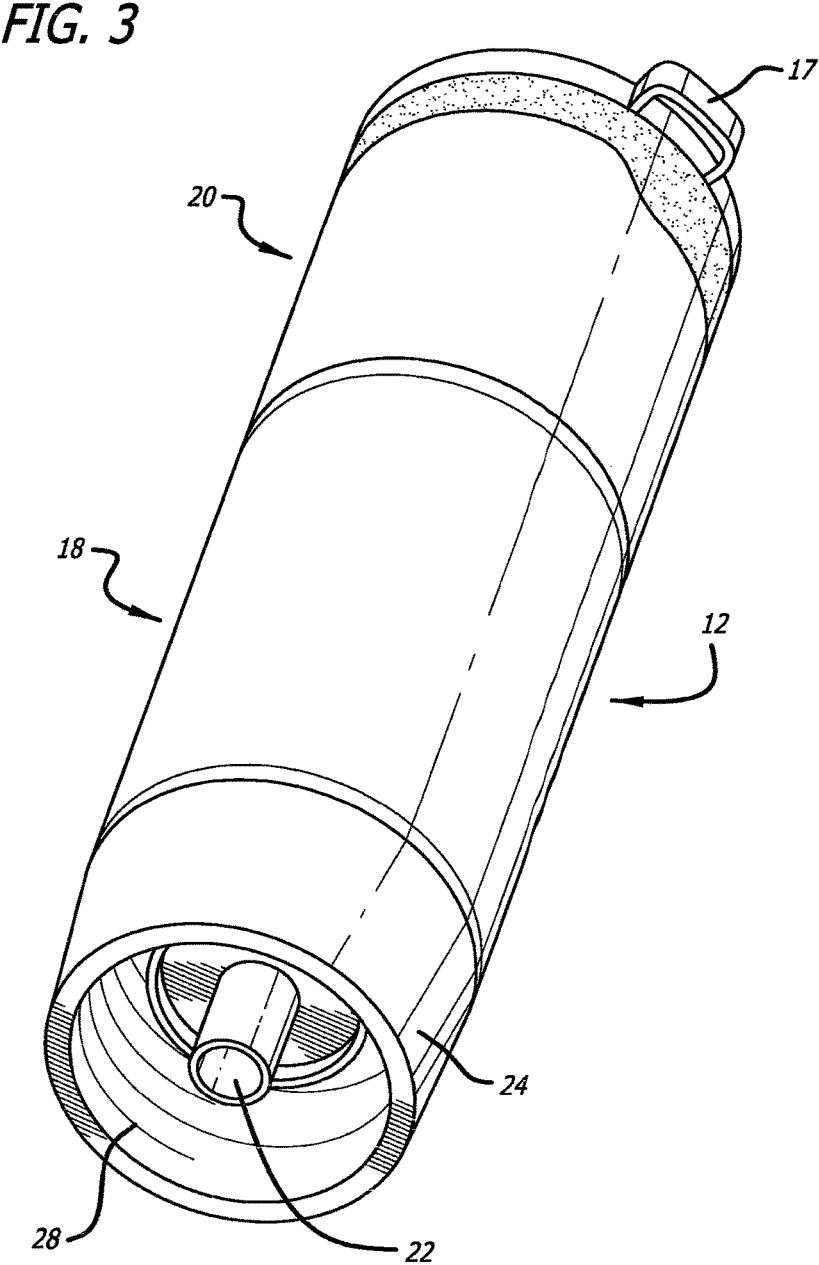
FIG. 3 is lower perspective view of the embodiment of FIG. 1, showing the intake port through which contaminated water enters the device.

As may best be seen in FIGS. 2, 3, and 4, the apparatus 12 also includes a loop or eyelet 17. A lanyard, string, or other similar element may be secured to this eyelet 17. In this way, the user can place the lanyard or string around his neck, for convenient carrying and to reduce the likelihood of losing the apparatus 12. Alternatively, for safe storage, the lanyard or string can be placed on a backpack or wrapped around a hook.

In general, the description in this specification will use "top" or "upper" and "bottom" or "lower" to describe the orientation and relative position of components when the apparatus 12 is used in the manner of a drinking straw. This is the manner of use for the apparatus 12 in the configuration depicted in FIGS. 1-4 of the drawings.

As may be seen in FIG. 1, the outer shell 14 extends along a substantial portion of the length of the apparatus 12. The length L of the outer shell 14 is shown in FIG. 1. As will be explained in more detail below, and as may be seen in FIG. 4, the hollow, elongated chamber 16 may be formed by or divided into two separate portions, i.e., a first lower chamber 18 and a second upper chamber 20.

Figure 11:
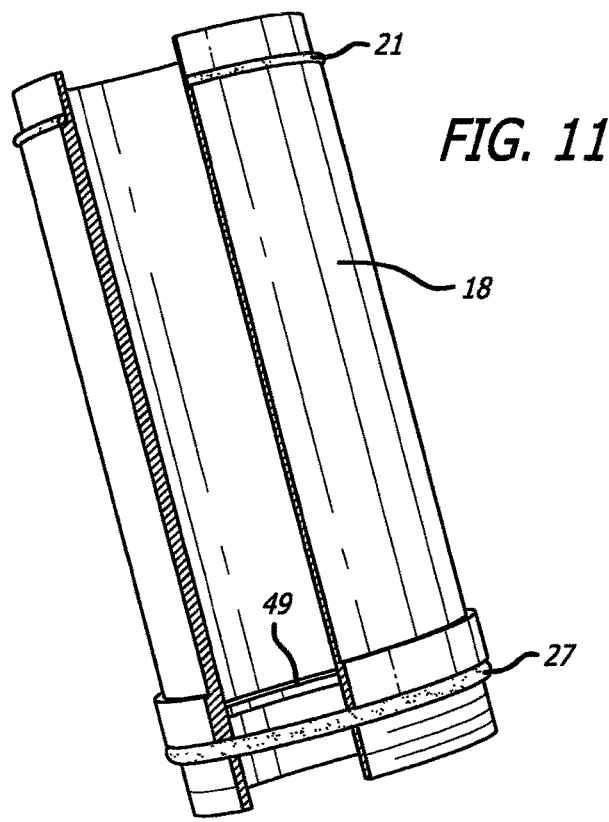
FIG. 11 is a perspective, partial cutaway view of the first lower chamber.

The structures defining the first lower chamber 18 and second upper chamber 20 may be secured to each other with complementary threads. As may be seen in FIG. 11, to prevent or inhibit leakage, an o-ring 21 is positioned on the first lower chamber 18. When the structures forming the first lower chamber 18 and second upper chamber 20 are secured together, this o-ring 21 creates a water-tight seal between those structures.

The volume of the first lower chamber 18 and the volume of the second upper chamber 20 are essentially equal to the volume of the hollow, elongated chamber 16. In this embodiment, the outer shell 14 essentially defines the outer periphery of the elongated chamber 16, and also essentially defines the outer periphery of both the first lower chamber 18 and the second upper chamber 20.

As may be seen in FIGS. 3 and 4, the apparatus 12 includes a first opening 22. Typically, this first opening 22 is positioned at the bottom of the apparatus 12, and is in communication with the hollow, elongated chamber 16. It is through this first opening 22 that contaminated water may be drawn into the chamber 16. In the embodiment shown in these Figures, and as may be seen in FIGS. 3 and 4, the first opening 22 is an integral part of, and is formed by, a dual-threaded, bottom intake cap 24.

Figure 13:
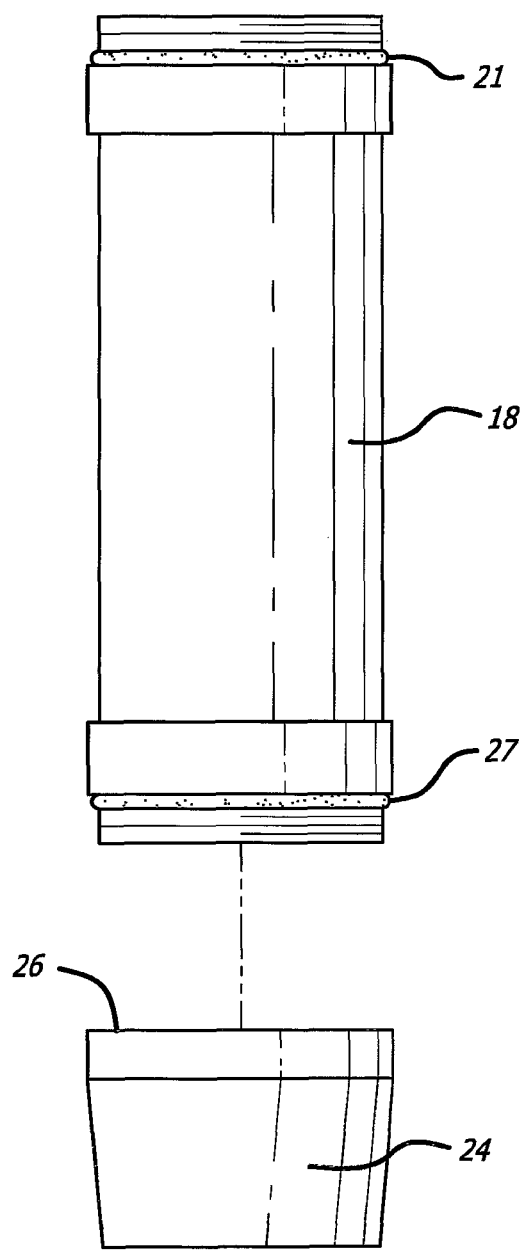
FIG. 13 is a perspective view of the bottom intake cap of FIGS. 1-3, disassembled from the first lower chamber.
Figure 14:
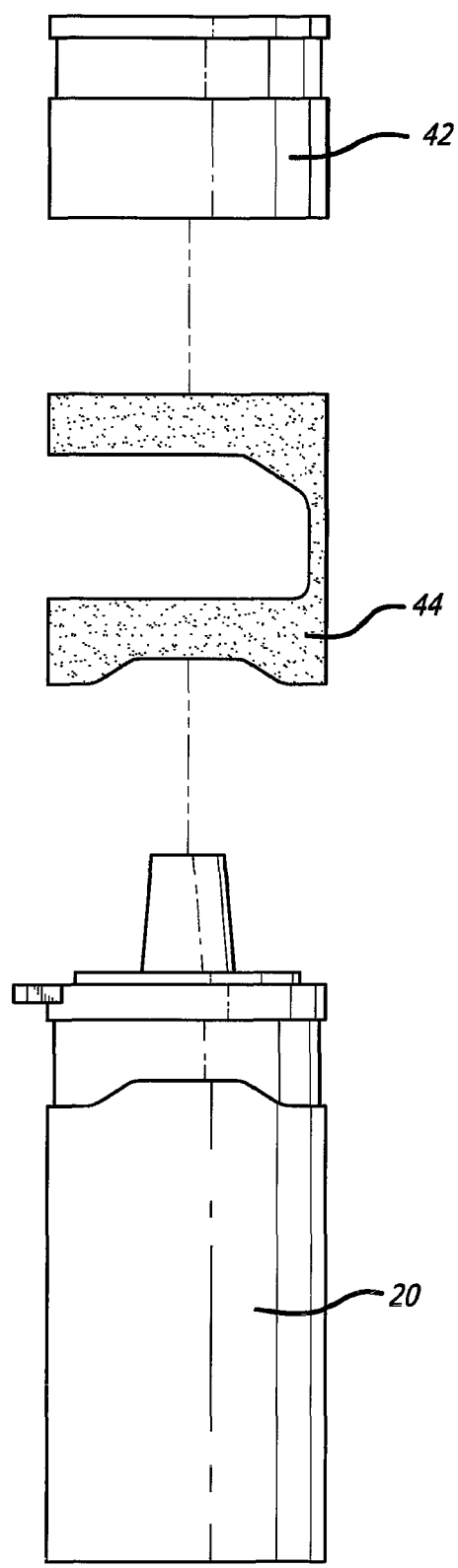
FIG. 14 is an exploded view of the second upper chamber, cap, and cap band of FIG. 1

As may be seen in FIGS. 4 and 13, the internal threads 26 of the bottom intake cap 24 are used to secure that cap 24 to the structure that forms and defines the first, lower chamber 18. As may be seen in FIGS. 11 and 13, that structure may include a conventional o-ring 27, to inhibit leakage between the lower chamber 18 and the adjacent cap 24.

As may be seen in FIGS. 3 and 4 and as will be explained in more detail below, the lower external threads 28 of the bottom intake cap 24 may be used to secure to that cap 24 containers holding contaminated water, or pumps.

Contaminated water is brought into the apparatus 12 through the first opening 22. As it passes through the apparatus 12, it is filtered and purified. As may be seen in FIGS. 2 and 4, the filtered and purified water is discharged from the apparatus 12 and its hollow, elongated chamber 16 through a second opening 30. When the apparatus 12 is used in the manner of a conventional drinking straw, i.e., in the orientation shown in FIGS. 1-4, this second opening 30 serves as a mouthpiece, and as the exit port for the purified water. When the apparatus 12 is used in the manner of a drinking straw, the second opening 30 is located at the top of the apparatus 12.

Purification of the contaminated water drawn into the portable water purifying apparatus 12 of the invention is accomplished by its passage through water purification media. While one or two such media can be used in this apparatus 12, the preferred embodiment of the invention includes three different media.

Figure 5:
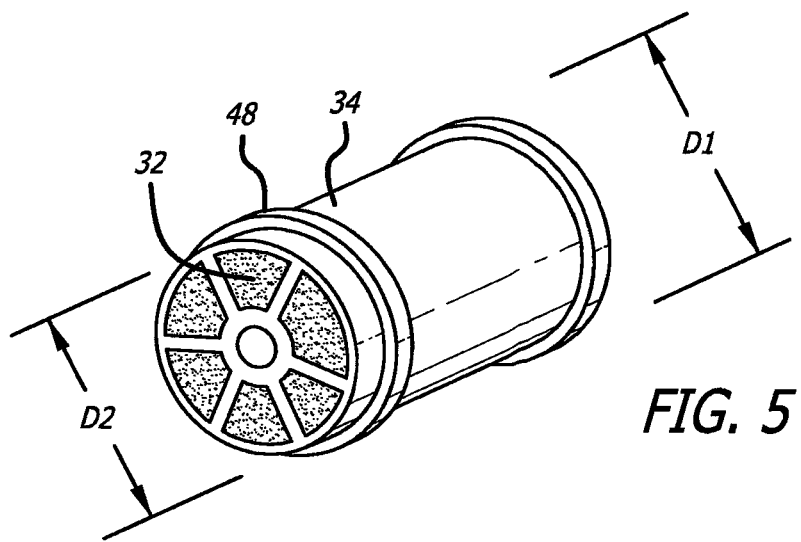
FIG. 5 is a perspective view of the first removable cartridge, as viewed from its water intake end, and depicting the ultrafiltration membrane that is substantially housed in the first removable cartridge and in the first lower chamber.
Figure 6:
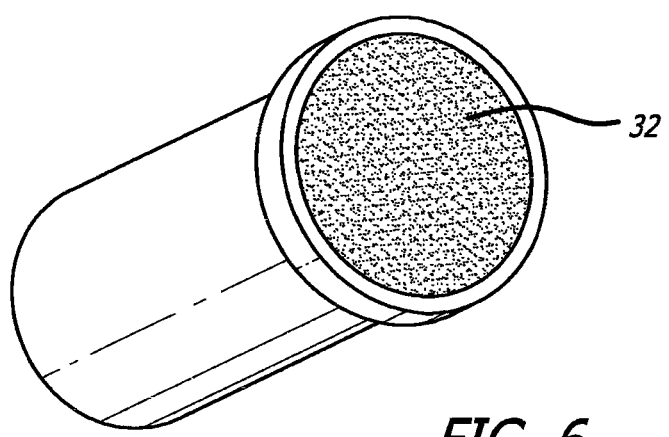
FIG. 6 is another perspective view of the first removable cartridge of FIG. 5, but as viewed from its water discharge end.

Specifically, the preferred media include an ultrafiltration membrane; a halogenated resin; and granulated, activated carbon. Most preferably, the water passes through the apparatus 12 in the order listed above, i.e., first through the ultrafiltration membrane, then through the halogenated resin, and finally through the granulated, activated carbon In this embodiment, the ultrafiltration membrane 32 is shown in FIGS. 5 and 6. Particularly, the ultrafiltration membrane 32 of FIGS. 5 and 6 is shown contained within first, removable cartridge 34. In this embodiment, the first, removable cartridge 34 is secured and housed within the first lower chamber 18 of the apparatus 12.

Figure 12:
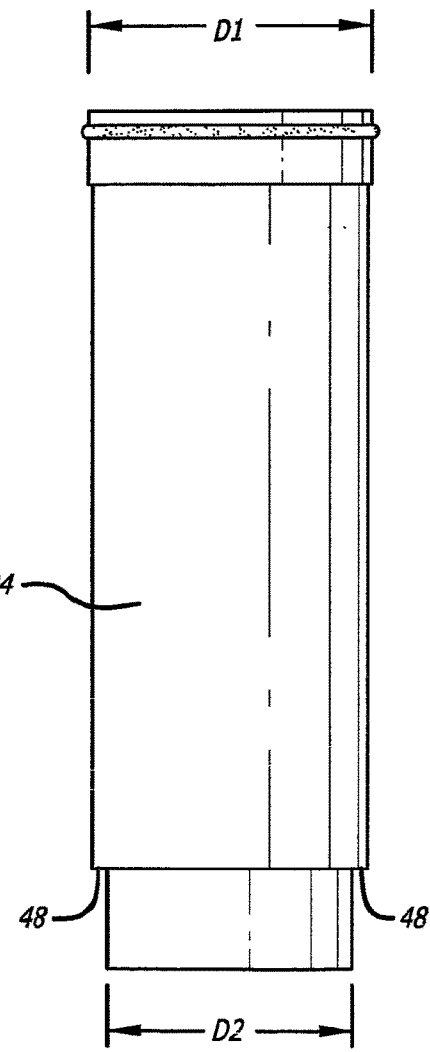
FIG. 12 is a side view of the first removable cartridge of FIG. 5.

As may be seen in FIGS. 5 and 12, the outer casing of the first removable cartridge 34 has two diameters. The upper portion of the first removable cartridge 34 has a diameter D1. The lower portion of the first removable cartridge 34 has a diameter D2. Here, the upper portion has a diameter D1 of approximately 1⅛". The lower portion is smaller, and has a diameter D2 of approximately 1 1/16". As may also be seen in FIGS. 5 and 12, as a result of these differences in diameter, a ring-shaped lip 48 is formed at the junction of the upper and lower portions of the first removable cartridge 34

Figure 7:
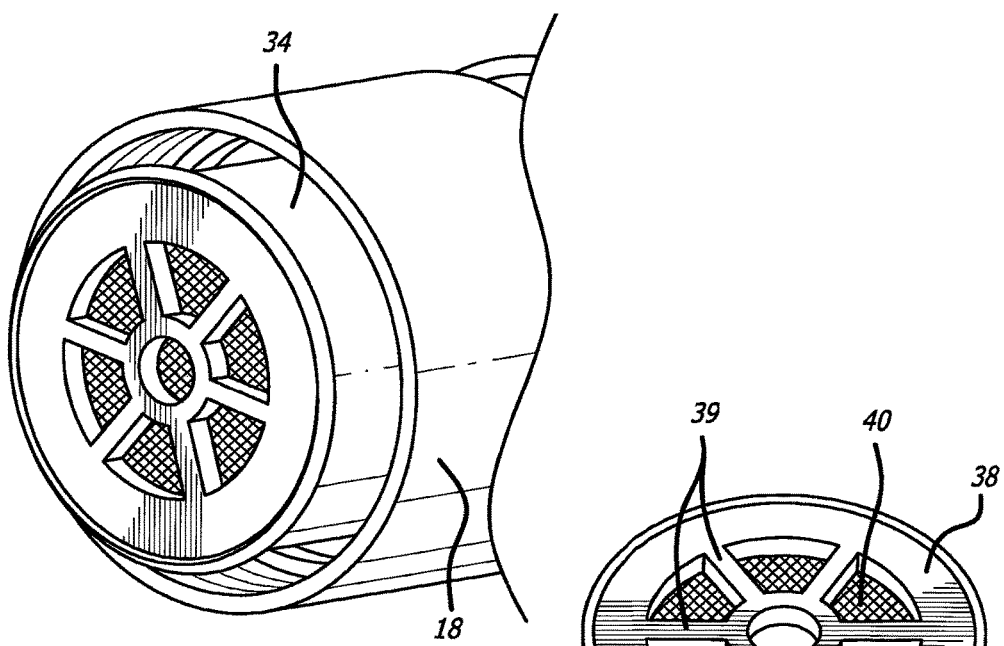
FIG. 7 is a perspective view of the first removable cartridge of FIGS. 5 and 6, and secured in place within the structure defining the first lower chamber.

FIG. 7 shows the first removable cartridge 34 of FIGS. 5 and 6, but inserted within the first lower chamber 18. To position the first removable cartridge 34, the cartridge 34 is placed in concentric alignment with and adjacent the top of the first lower chamber 18, and pushed down into that chamber 18. The outer wall of the cartridge 34 is sized to create a close friction fit with the inner wall of the first lower chamber 18. As the removable cartridge 34 is pushed down into the first lower chamber 18, its lip 48 ultimately reaches, and is stopped by, a ring-shaped flange 49. As may be seen in FIG. 11, that flange 49 is formed on the inner wall of the first lower chamber 18.

Referring again to FIG. 5, the ultrafiltration membrane 32 contained within the first removable cartridge 34 can be of any suitable type, but must be FDA approved for use with water or foods, i.e., it should be of a food grade standard. In this embodiment, the preferred ultrafiltration membrane 32 is a polysulfone ultrafiltration membrane, available from Miniwell Outdoor Equipment Co., Ltd., of Guangzhou, China. It is believed to be comprised of elongated, hollow strands.

During manufacture, the strands of the ultrafiltration membrane 32 are inserted into an open end of the first removable cartridge 34. Particularly, the membrane 32 is inserted by folding the strands over each other. This folding of the ultrafiltration strands creates a generally cylindrical plug that substantially fills the interior of the first removable cartridge 34. The plug is of adequate diameter, so that it presses tightly on the inner walls of the first removable cartridge 34.

To ensure that all of the water that flows through the apparatus 12 is initially filtered by the ultrafiltration membrane 32, the outer perimeter of this cylindrical plug is adhered to the inner wall of the first removable cartridge 34. The adhesive keeps this cylindrical membrane plug in place, and fills in any spaces between the perimeter of the cylindrical plug and the inner wall of the first removable cartridge 34. In this way, the adhesive creates a seal and ensures that substantially all contaminated water flows through the ultrafiltration membrane 32. Particularly, by the use of this adhesive, the water is inhibited from passing between the membrane plug and the inner wall of the first removable cartridge 34, preventing by-passing.

Any suitable food safe, water-proof adhesive that is compatible with the polysulfone ultrafiltration membrane and the ABS plastic may be used.

Virtually all water filtration media have a limited life, and must eventually be replaced. In this case, a replacement for the first removable cartridge 34, including its glued cylindrical ultrafiltration membrane plug, may be obtained from Water One of Southwest Florida, Inc., of Fort Myers, Fla.

In this embodiment, the ultrafiltration membrane 32 can extend the life of both the halogenated resin and the activated, granulated carbon. The ultrafiltration membrane 32 does this by providing most of the filtering of the contaminated water. Specifically, the ultrafiltration membrane 32 removes particulates, cryptosporidium, Giardia, viruses, pathogens, and bacteria. This eases the cleaning load on the subsequent media, i.e, the halogenated resin and the granulated, activated carbon.

In this embodiment, the first removable cartridge 34 and its ultrafiltration membrane 32 are contained or substantially contained within the first lower chamber 18. In this way, any contaminated water being drawn through the bottom of the apparatus 12 is first contacted by the ultrafiltration membrane 32.

In contrast, the halogenated resin and granulated, activated carbon are contained or substantially contained within the second upper chamber 20.

Figure 8:
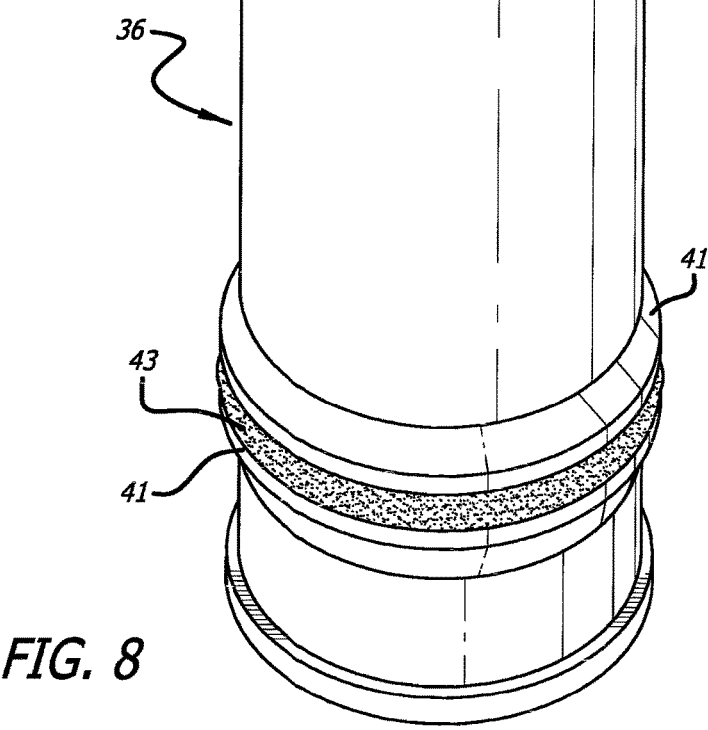
FIG. 8 is a perspective view of the second removable cartridge.
Figure 15:
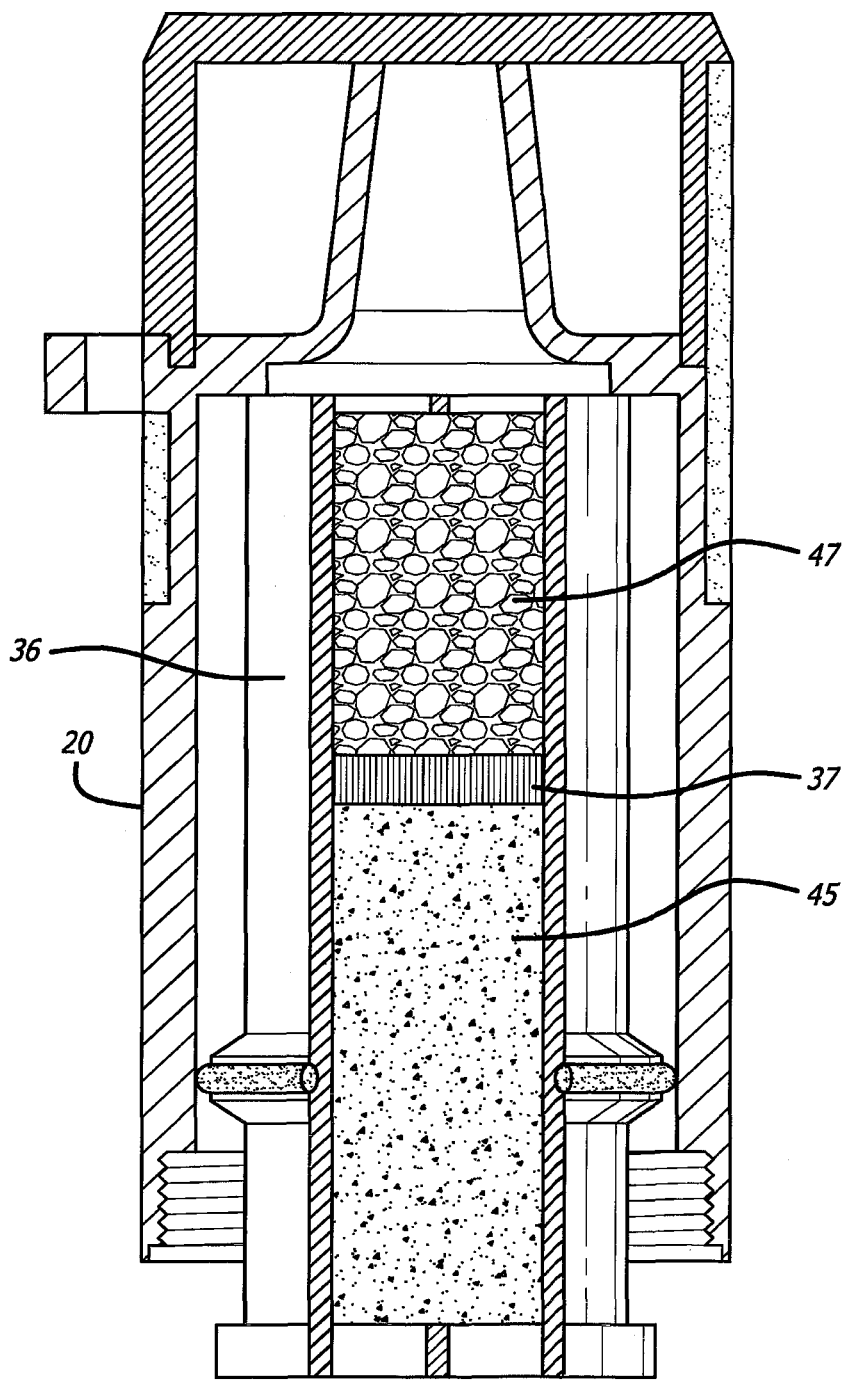
FIG. 15 is a perspective, partially cutaway view of the second upper chamber, with the second removable cartridge inserted in place for use within the apparatus.

The second removable cartridge 36 shown in FIGS. 8 and 15 contains both the halogenated resin 45 and the granulated, activated carbon 47. In the embodiment of the second removable cartridge 36 shown in FIGS. 8 and 15, the halogenated resin 45 is separated from the granulated, activated carbon 47 by a 200-micron polyester filter pad 37.

As may be seen in FIG. 8, the upper end of the second removable cartridge 36 includes a plurality of spokes 39. These spokes 39 provide that upper end with structural rigidity, while also permitting water to pass through that upper end, and out of the second removable cartridge 36. The interior of the upper end of this cartridge 36 includes a circular, wire mesh screen 40 adjacent the spokes 39.

This wire mesh screen 40 has a preferred opening size of 200 mesh or smaller. While the preferred material of this wire mesh screen 40 is stainless steel, it may also be made of a plastic. The purpose of this wire mesh screen 40 is to prevent small, breakaway pieces of the granulated activated carbon 47 from escaping from the second removable cartridge 36 and from the apparatus 12.

Figure 9:
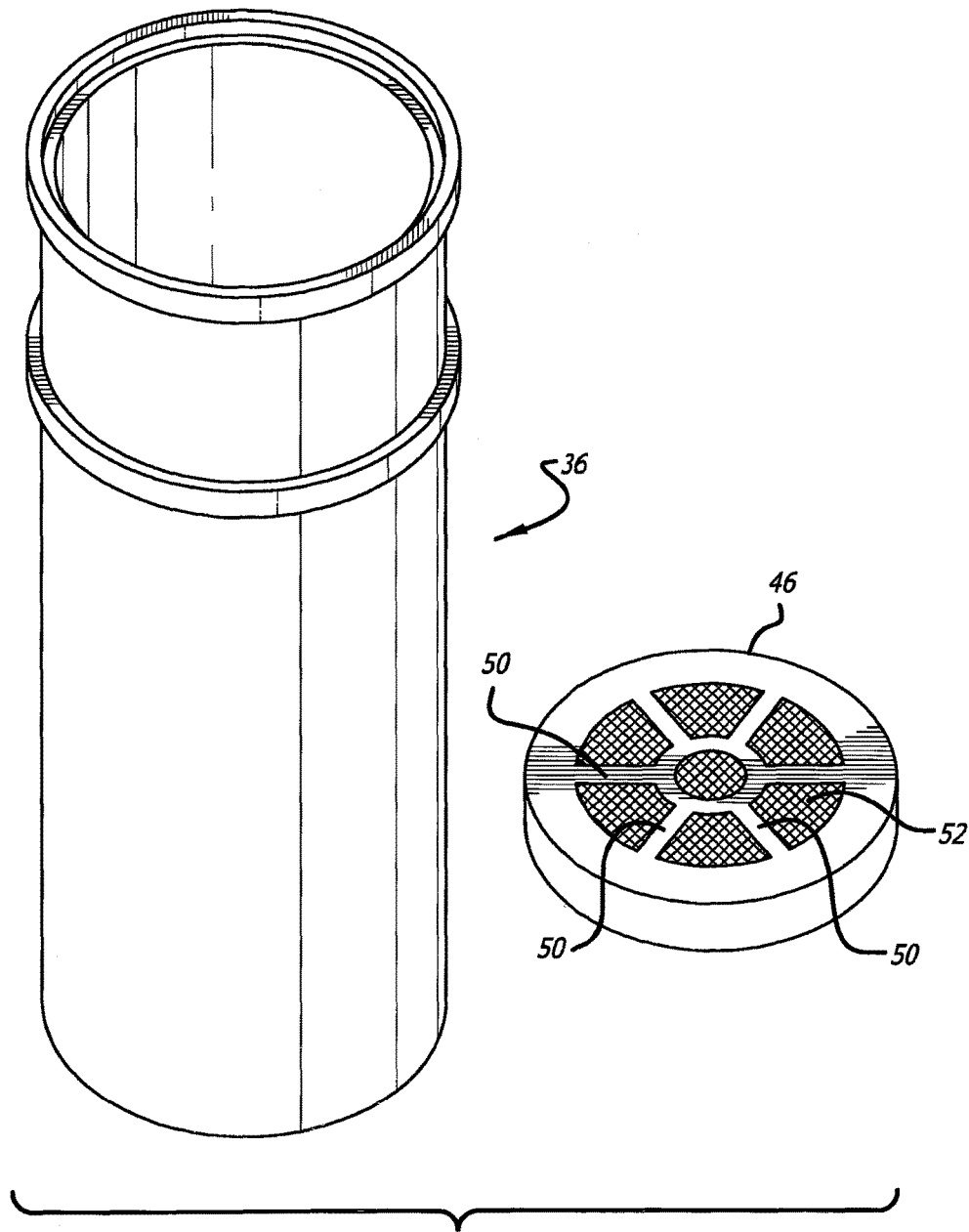
FIG. 9 is a perspective view of the second removable cartridge, but inverted from the position depicted in FIG. 8.
Figure 10:
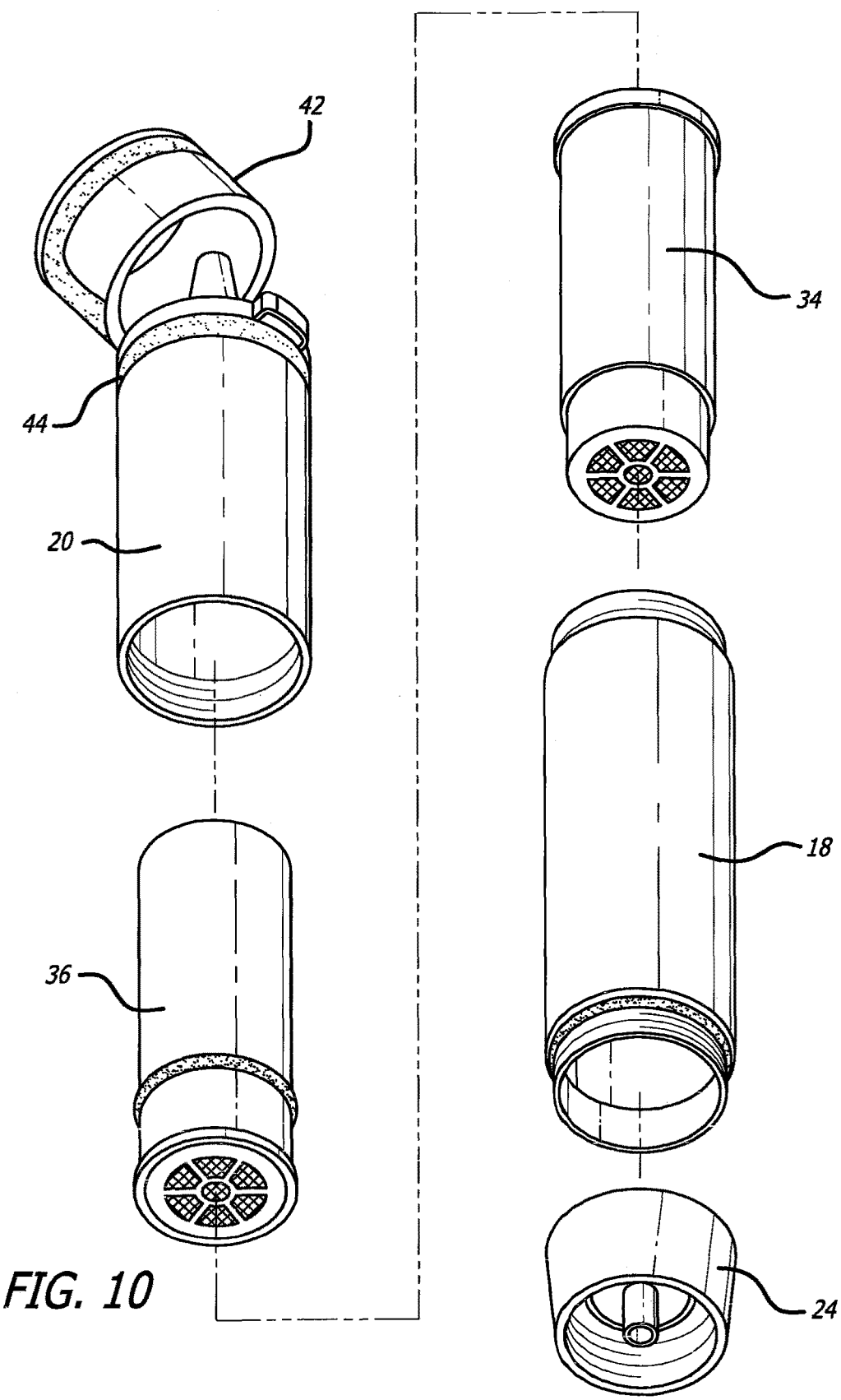
FIG. 10 is an exploded view of the apparatus shown in FIGS. 1-3.

Referring now to FIG. 9, the second removable cartridge 36 of FIG. 8 has been inverted. In this way, the top of FIG. 9 shows the initially open lower end of the second removable cartridge 36. The water filtration media can be inserted into the interior of the cartridge 36 through this open, lower end.

After the media have been inserted into the interior of the cartridge 36, its lower end is closed by overcap 46, which is also shown in FIG. 9. In a manner similar to the integrally formed structure at the top of the cartridge 36, the overcap 46 includes six spokes 50. The function of these spokes 50 is to provide structural rigidity to the overcap 46, while permitting the flow of water into the bottom of the second removable cartridge 36. A circular wire mesh screen 52, like that described above, is secured to the interior of the overcap 46.

In addition, the overcap 46 is dimensioned and formed so that it can be securely press-fit onto the bottom, open end of the second removable cartridge 36. Installing the overcap 46 onto the open end of the second removable cartridge 36 completes the assembly of that cartridge 36, and places the cartridge 36 in condition for use within the apparatus 12.

As noted above, this second removable cartridge 36 preferably contains both the halogenated resin 45 and the granulated, activated carbon 47.

Any of a number of halogenated resins may be used for the invention. Here, a preferred halogenated resin 45 is the Virobac™ resin, similar to that disclosed in U.S. Pat. No. 4,420,590. The Virobac™ resin is available in replacement second removable cartridges 36 from Water One of Southwest Florida, Inc, Fort Myers, Fla. Other generally suitable halogenated resins include those available from Katadyn, Products, Inc., Minneapolis, Minn.; and Umqua Research Company, Myrtle Creek, Oreg.

Similarly, any number of granulated, activated carbons may be used for the invention. The most preferred granulated, activated carbon 47 is available from Active Manufacturing, Cape Coral, Fla., with a 20×40 mesh size.

The granulated, activated carbon 47 is essentially a finishing media. The ultrafiltration membrane and the halogenated resin 45 have done most of the decontamination of the water before that water ever reaches the granulated, activated carbon 47. Essentially all that is left for the granulated, activated carbon 47 is to remove any residual colors and odors from the water, so as to improve its taste In the assembled device 12, the second removable cartridge 36 of FIG. 8 is installed and contained within the second upper chamber 20. To position the second removable cartridge 36, it is placed in concentric alignment with and adjacent to the bottom of the second upper chamber 20, and pushed upwardly into that chamber 20. Two flared portions 41 and an intermediate o-ring 43 on the outer wall of the cartridge 36 are sized to create a close friction fit with the inner wall of the second upper chamber 20. As the second removable cartridge 36 is pushed up into the second upper chamber 20, the top end of that cartridge 36 reaches to limit of its travel within the second upper chamber 20. At that point, the cartridge 36 is securely seated within the second upper chamber 20 and available for use in the apparatus 12.

The present apparatus 12 is of the "on-contact, on-demand" type. By this, it is meant that water moves quickly from the first opening 22 to the second opening 30, killing bacteria and viruses without the need for residence time within the apparatus 12.

In operation, the user draws water through the apparatus 12 in any of a number of ways. As noted above, one way of moving water through the water purifier is by using it in the manner of a drinking straw. Particularly, referring now to FIG. 1, the user removes the cap 42 from the top of the apparatus 12 In order to prevent its loss in the field or elsewhere, the cap 42 is tethered to the apparatus 12 with an elastic cap band 44, in much the same way that a automobile's gas cap is tethered to its fuel filler neck.

As may be seen by a comparison of FIGS. 1 and 2, removal of the cap 42 exposes the second opening or mouth piece 30 of the apparatus 12. To operate the apparatus 12, the user simply places the first opening 22 of the bottom intake cap 24 into the contaminated water. The user then places his mouth over the mouthpiece 30, and draws on the mouthpiece 30, in substantially the same way that a user would draw upon the top of a drinking straw.

As suggested above, there are other ways of using the apparatus 12. The external threads 28 of bottom intake cap 24 have a standard, 28 mm finish. A collapsible bag made of vinyl or other pliable, waterproof material with complementary, standard 28 mm threads may be filled with contaminated water. The collapsible bag is then secured to the external threads 28. The apparatus 12 and collapsible bag assembly may then be turned upside down. The contaminated water will feed through the apparatus 12 at a rate of approximately 250 ml per minute. When the water leaves the apparatus 12 through the second opening 30, it will be purified. The advantage of securing the collapsible bag to the apparatus, and inverting the two, is that the user may observe the water as it leaves the second opening 30. This provides the user with a visual check of the purity of the water—something that is not possible if the water is ingested directly from the mouthpiece 30, as when the apparatus 12 is used in the manner of a drinking straw. This method also has the advantage of enabling the collection of water into a large container, so that it may be used later, or accessed by a number of people. This eliminates the need for a water purifying apparatus 12 for each person in a group.

There is yet another way to use the inverted purifier apparatus 12. A two-liter or larger source water gravity feed bag may be secured to a tree or other supporting platform. The source water gravity feed bag is then connected to the first opening 22 by attaching a flexible, collapsible hose or tube between the bag and the first opening 22. The hose or tube includes an on and off plastic clamp that is normally in a closed position, i.e., pinching on and preventing water from escaping through the collapsible hose or tube.

A user who wants purified water merely opens the clamp. At that point, water will be able to flow freely from the collapsible bag, into the first opening 22, through the purifier 12, out through the second opening 30, and into a glass, pot, or other receptacle being held by the user. When adequate water has been removed by this user, the clamp is closed so that it again pinches the collapsible hose, preventing water from escaping. The unit is now ready to provide purified water to the next user by repeating the steps described above.

The apparatus 12 may also be used with a hand pump. The hand pump moves water from a contaminated water source and through the purifier 12. One manner of using the hand pump is to secure it to an intake hose. The intake hose includes a pre-filter, and a bobber-like flotation device to prevent contact of the pre-filter with the potentially muddy bottom of the water source.

As the user manually activates the hand pump, contaminated water from the water source is moved by the pump through the intake hose, into first opening 22, through the apparatus 12, and then out through the second opening 30.

Finally, the apparatus 12 may be used with a hydration back pack, such as a camelback-type. Normally, such hydration backpacks are used for containing and dispensing clean water through a discharge hose. One end of this discharge hose is attached to the backpack, and the other end of the hose dispenses clean water to the user.

In contrast, if the hydration backpack contains contaminated water, that water must be purified before being ingested by the user. In this case, the user would cut the discharge hose in the hydration backpack. The apparatus 12 would then be placed between the cut portions of the discharge hose.

In operation, the contaminated water from the hydration backpack would move through the end of the cut hose nearest that backpack, and then enter the first opening 22. The contaminated water would move through the apparatus 12, and exit the apparatus from the second opening 30, as purified water. From the second opening 30, the purified water would move through the portion of the cut hose farthest from the hydration backpack, and be available for ingestion by the user.

Cleaning can extend the life of the purifier apparatus 12. One method of cleaning the purifier 12 is for the user to remove the bottom cap 24, and then blow air through the top of the apparatus 12, i.e., through the second opening 30 and in a counter-flow direction.

Another method of cleaning the apparatus 12 is by the use of the pump described above. To clean in this manner, one first removes the bottom cap 24. Then, one end of a flexible tube or hose is attached to the pump. Next, the other end of the flexible tube or hose is attached to the second opening 30. Finally, the pump is activated by the user, so as to move either air or water through the apparatus 12 in the reverse direction, i.e., from the top to the bottom of the apparatus 12.

The preferred embodiment above includes a particular combination of media, i.e., the ultrafiltration membrane, the halogenated resin, and the granulated, activated carbon. A second embodiment does not include any particular media, but is a water purification apparatus that includes one or more replaceable cartridges that can be filled and used with various combinations of filtration or purification media.

What is claimed is:

1. An on-contact, on-demand portable water purifying apparatus, comprising:
   an outer shell defining a hollow, elongated chamber;
   a first opening in a bottom of said outer shell, for drawing contaminated water into the chamber;
   a second opening in a top of said outer shell, for removing purified water from that chamber;
   said elongated chamber has a first lower chamber defined by a lower portion of the outer shell that creates an inner wall of the first lower chamber;
   said elongated chamber has a second upper chamber defined by an upper portion of the outer shell that creates an inner wall of the second upper chamber;
   said first lower chamber is adjacent to said first opening;
   said second upper chamber is adjacent to said second opening;
   a first removable cartridge which is insertable into said first lower chamber;
   a second removable cartridge which is insertable into said second upper chamber;
   said first removable cartridge having an outer wall sized to create a friction fit within the first lower chamber;
   said second removable cartridge having an outer wall sized to create a friction fit within the second upper chamber;
   said first removable cartridge contains an ultrafiltration membrane within its outer wall; and
   said second removable cartridge contains a halogenated resin and granulated activated carbon within its outer wall.

2. An on-contact, on-demand portable water purifying apparatus, comprising:
   an outer shell defining a hollow, elongated chamber;
   a first opening in a bottom of said outer shell, for drawing contaminated water into the chamber;
   a second opening in a top of said outer shell, for removing purified water from that chamber;
   said elongated chamber has a first lower chamber defined by a lower portion of the outer shell that creates an inner wall of the first lower chamber;

said elongated chamber has a second upper chamber defined by an upper portion of the outer shell that creates an inner wall of the second upper chamber;
said first lower chamber is adjacent to said first opening;
said second upper chamber is adjacent to said second opening;
a first removable cartridge which is insertable into said first lower chamber;
a second removable cartridge which is insertable into said second upper chamber;
said first removable cartridge having an outer wall to create a friction fit within the first lower chamber;
said second removable cartridge having an outer wall with an O-ring located thereon to create a friction fit within the second upper chamber;
said first removable cartridge contains an ultrafiltration membrane within its outer wall; and
said second removable cartridge contains a halogenated resin and granulated activated carbon within its outer wall.

* * * * *